(12) United States Patent
Mir

(10) Patent No.: US 6,296,751 B1
(45) Date of Patent: Oct. 2, 2001

(54) ELECTRODEIONIZATION APPARATUS WITH SCALING CONTROL

(76) Inventor: Leon Mir, 15 Hobart Rd., Newton, MA (US) 02459

( * ) Notice: Subject to any disclaimer, the term of this patent is extended or adjusted under 35 U.S.C. 154(b) by 0 days.

(21) Appl. No.: 09/526,658

(22) Filed: Mar. 15, 2000

Related U.S. Application Data

(63) Continuation-in-part of application No. 09/395,327, filed on Sep. 13, 1999, now Pat. No. 6,187,182.

(51) Int. Cl.⁷ .................................................. B01D 61/48

(52) U.S. Cl. .................... 204/524; 204/525; 204/533; 204/536; 204/632

(58) Field of Search ................................. 204/524, 525, 204/533, 536, 632

(56) References Cited

U.S. PATENT DOCUMENTS

| | | | |
|---|---|---|---|
| Re. 35,741 | 3/1998 | Oren et al. ............................ | 204/524 |
| 4,632,745 | 12/1986 | Giuffrida et al. ..................... | 204/301 |
| 4,636,296 | 1/1987 | Kunz ................................... | 204/182.5 |
| 4,747,929 | 5/1988 | Siu et al. ............................. | 204/301 |
| 4,753,681 | 6/1988 | Giuffrida et al. .................. | 134/22.17 |
| 4,804,451 | 2/1989 | Palmer ................................ | 204/301 |
| 4,871,431 | 10/1989 | Parsi .................................. | 204/182.4 |
| 4,931,160 | 6/1990 | Giuffrida ............................. | 204/301 |

(List continued on next page.)

FOREIGN PATENT DOCUMENTS

WO 00/23382  4/2000 (WO) .

OTHER PUBLICATIONS

Gary C. Ganzi et al., Water Purification and Recycling Using the CDI Process, Ionpure Technologies Corp., Lowell, MA 01851, pp. 49–53 (No date).

E. Glueckauf, M.Sc., D.Sc., Electro–Deionisation Through a Packed Bed, Dec. 1959, pp. 646–651.

O. Kedem et al., A Simple Electrodialysis Stack, Desalination, 24 (1978) pp. 313–319, Elsevier Scientific Publishing Company, Amsterdam—Printed in The Netherlands.

P–Series Heavy Industrial CDI® Systems Single and Multiple Module, United States Filer Corporation, Lowell, Massachusetts (No date).

Deionization, EDI and Membranes: Practical Ways to Reduce Chemical Usage When Producing High–Purity Water, Ultrapure Water® Jul./Aug. 1999, pp. 52–55.

*Primary Examiner*—Arun S. Phasge
(74) *Attorney, Agent, or Firm*—Fish & Richardson P.C.

(57) ABSTRACT

First and second stages are used in electrodeionization to purify water including calcium and carbon dioxide and its hydrates. The diluting flow channels of the first stage include only anion exchange material or cation exchange material, and thus remove either carbon dioxide and its hydrates (and other anions) or calcium (and other cations) but not the other. The diluting flow channels of the second stage receive the diluting channel effluent from the first stage and include the other type of exchange resin (or a mixed resin) and remove the oppositely charged ions. The brine effluent from the concentrating flow channels in the first stage is isolated from the second stage, and calcium and total inorganic carbon tend to be removed in different stages so as to deter calcium carbonate precipitation in any of the concentrating flow channels. Also the concentrating channels can include cation exchange material next to the anion membrane, with pH being lowered at the surface of the anion so as to limit calcium carbonate precipitation in the concentrating flow channel. Also disclosed are using countercurrent flow in the diluting flow channels and the concentrating flow channels and flowing the feed to the concentrating compartment first through a region that renders it substantially acidic before it enters a region that contains calcium.

17 Claims, 10 Drawing Sheets

U.S. PATENT DOCUMENTS

| | | | |
|---|---|---|---|
| 4,956,017 | 9/1990 | Giuffrida et al. | 204/301 |
| 5,019,270 | 5/1991 | Afeyan et al. | 210/656 |
| 5,026,465 | 6/1991 | Katz et al. | 204/182.4 |
| 5,066,375 | 11/1991 | Parsi et al. | 204/182.4 |
| 5,093,197 | 3/1992 | Howard et al. | 428/372 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,203,976 | 4/1993 | Parsi et al. | 204/182.4 |
| 5,228,989 | 7/1993 | Afeyan et al. | 210/198.2 |
| 5,292,422 | 3/1994 | Liang et al. | 204/301 |
| 5,308,466 | 5/1994 | Ganzi et al. | 204/151 |
| 5,308,467 | 5/1994 | Sugo et al. | 204/301 |
| 5,316,637 | 5/1994 | Ganzi et al. | 204/182.4 |
| 5,346,924 | 9/1994 | Giuffrida | 521/28 |
| 5,376,253 | 12/1994 | Rychen et al. | 204/301 |
| 5,384,042 | 1/1995 | Afeyan et al. | 210/198.2 |
| 5,425,866 | 6/1995 | Sugo et al. . | |
| 5,503,729 | 4/1996 | Batchelder et al. | 204/630 |
| 5,512,173 | 4/1996 | Uchino et al. | 204/632 |
| 5,531,899 | 7/1996 | Yen et al. | 210/638 |
| 5,558,753 | 9/1996 | Gallagher et al. | 204/632 |
| 5,584,981 | 12/1996 | Turner et al. . | |
| 5,593,563 | 1/1997 | Denoncourt et al. | 204/524 |
| 5,679,228 | 10/1997 | Elyanow et al. | 204/524 |
| 5,679,229 | 10/1997 | Goldstein et al. | 204/524 |
| 5,681,438 | 10/1997 | Proulx | 204/627 |
| 5,738,775 | 4/1998 | Nagai et al. | 204/632 |
| 5,759,373 | 6/1998 | Terada et al. | 204/524 |
| 5,762,774 | 6/1998 | Tessier | 204/524 |
| 5,833,861 | 11/1998 | Afeyan et al. | 210/656 |
| 5,858,191 | 1/1999 | DiMascio et al. | 204/524 |
| 5,868,915 | 2/1999 | Ganzi et al. | 204/524 |
| 5,961,805 | 10/1999 | Terada et al. | 204/632 |
| 6,056,878 | 5/2000 | Tessier et al. | 210/639 |
| 6,149,788 * | 11/2000 | Tessier et al. | 204/632 |

\* cited by examiner

ELECTRODEIONIZATION APPARATUS WITH SCALING CONTROL

This application is a continuation-in-part of U.S. Ser. No. 09/395,327, filed on Sep. 13, 1999, now U.S. Pat. No. 6,187,162.

TECHNICAL FIELD

The invention relates to apparatus and methods for carrying out electrodeionization to purify water.

BACKGROUND

Electrodeionization is a process for removing ions from liquids by sorption of these ions into a solid material capable of exchanging these ions for either hydrogen ions (for cations) or hydroxide ions (for anions) and simultaneous or later removal of the sorbed ions into adjacent compartments by the application of an electric field. (See Glueckauf, E., "Electro-Deionization Through a Packed Bed", Dec. 1959, pp. 646–651, British Chemical Engineering for a background discussion.) The hydrogen and hydroxide ions needed to drive the ion exchange process are created by splitting of water molecules at the interface of anion and cation exchanging solids that contact each other in the orientation that depletes the contact zone of ions, when in the presence of an electric field. This orientation requires that the anion exchanging material face the anode and the cation exchanging material face the cathode. The created hydroxide ions enter the anion exchanging material, and the created hydrogen ions enter the cation exchanging material.

The electrodeionization process is commonly carried out in an apparatus consisting of alternating diluting compartments and concentrating compartments separated by anion permeable and cation permeable membranes. The diluting compartments are filled with porous ion exchanging solid materials through which the water to be deionized flows. The ion exchanging materials are commonly mixtures of cation exchanging resins and anion exchanging resins (e.g., U.S. Pat. No. 4,632,745), but alternating layers of these resins have also been described (e.g., U.S. Pat. Nos. 5,858,191 and 5,308,467). Ion exchanging materials consisting of woven and non-woven fibers have also been described. (E.g., U.S. Pat. Nos. 5,308,467 and 5,512,173). The compartments adjoining the diluting compartment into which the ions are moved by the applied electric field, called concentrating compartments, may be filled with ion exchanging materials or with inert liquid permeable materials. An assembly of one or more pairs of diluting and concentrating compartments, referred to as a "cell pair", is bounded on either side by an anode and a cathode which apply an electric field perpendicular to the general direction of liquid flow. Flow of water is provided past the anode and cathode.

The diluting compartments are each bounded on the anode side by an anion permeable membrane and on the cathode side by a cation permeable membrane. The adjacent concentrating compartments are each correspondingly bounded by a cation permeable membrane on the anode side and an anion permeable membrane on the cathode side. The applied electric field causes anions to move from the diluting compartment across the anion permeable membrane into the concentrating compartment nearer the anode and cations to move from the diluting compartment across the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane. A flow of water is set up to remove the ions from the concentrating compartments. The net result of the process is the removal of ions from the water stream flowing through the diluting compartments and their concentration in the water flowing through the concentrating compartments.

Electrodeionization (EDI) stacks frequently suffer from precipitation of calcium carbonate in the concentrating compartments as well as in the cathode compartment. (See AEDI and Membranes: Practical Ways to Reduce Chemical Usage when Producing High Purity Water, William E. Katz in Ultrapure Water, Vol. 16, No. 6 July/August 1999, pp 52–57). The consequence of this "scaling" is an increase in stack resistance, a drop in current density and eventually a sharp decrease in the purity of the product water.

Vendors of EDI equipment suggest that the concentration of calcium in the feed to the EDI be limited to very low levels; e.g., less than 0.5 ppm. (U.S. Filter Literature No. US2006). While this concentration can be achieved when the electrodeionization apparatus is fed with reverse osmosis (RO) permeate from an RO system with new membranes, and the RO system is operating properly, the suggested values can be exceeded when these conditions do not hold.

In order for calcium carbonate to precipitate in solution the Langelier Saturation Index (LSI) has to be positive. In the cathode compartment the pH can be high enough for the LSI to be positive; precipitation of calcium carbonate is therefore to be expected under some circumstances. The LSI of RO permeates is always negative. Even in the EDI brine the concentrations of calcium and bicarbonate are so low that the LSI is still negative, at the prevailing pH. Thus, on the basis of consideration of LSI alone, one would not expect the precipitation of calcium carbonate that occurs within EDI concentrating compartments. This phenomenon is instead explainable based upon local conditions.

When a concentrating compartment from a "scaled" EDI stack is examined, the scale is observed on the anion membrane, predominantly halfway between the inlet and the outlet of the stack. This pattern can be explained on the basis of the mechanism by which an EDI stack removes weak acids like carbon dioxide and silica. At the pH of RO permeate, only a tiny fraction of silica is ionized, and a large fraction of the total inorganic carbon (TIC) is in the form of carbon dioxide. In order for silica and carbon dioxide to be removed by EDI, the feed solution needs to contact anion exchange resin in the diluting compartment, which is partly in the OH– form, regenerated. Carbon dioxide and silica diffuse from solution into the partly regenerated anion resin and react with the OH– to form the $HCO_3^-$, $CO_3^{2-}$ and $HSiO_3^-$ anions which are moved, along with substantial amounts of OH–, by the applied voltage gradient, into the concentrating compartment. In order for the above mechanism to operate, the voltage drop in the diluting compartment has to be high enough, typically 2 to 3 volts, to regenerate some portion of the anion resin by the splitting of water into OH– and H+.

At the inlet portion of an EDI stack the extent of resin regeneration in the diluting compartment is low. Carbon dioxide and silica are therefore not removed in the front part of the stack. Toward the middle of the stack the concentrations of the ions in the feed water have dropped sharply and water splitting takes place. The resins are partly regenerated and the carbon dioxide and silica are removed. The pH of the solution on the concentrating side surface of the anion membrane is therefore very high; the concentration of $CO_3^=$ is also high, and the LSI can be positive at the concentration of calcium prevailing in the concentrate. (See U.S. Pat. No. 5,593,563). Calcium carbonate can therefore precipitate, as shown in FIG. 5. Note that the LSI within the bulk of the concentrate is still negative because the pH of the concentrate is virtually the same as that of the feed. The high pH at the surface of the anion membrane and the corresponding low pH at the surface of the cation membrane are boundary layer phenomena.

Toward the outlet of the stack virtually all of the anions have been removed. Although the concentrating side of the anion membrane is still at a very high pH, the concentration of $CO_3^=$ is so low that the LSI index is negative, and calcium carbonate does not precipitate.

If it were not for the need to remove the weak acids by operating the EDI stack in a partly regenerated form, there would not be any problem with calcium carbonate precipitation. In order for EDI stacks to replace ion exchange beds, which remove these weak acids, EDI stacks must be operated in a partly regenerated form and consequently calcium carbonate precipitation is always a threat.

The problem of calcium carbonate precipitation has been broadly recognized, and various suggestions have been made to deal with it. One approach is the periodic reversal of the role of the diluting and concentrating compartments with a simultaneous reversal of the polarity of the electrodes. (E.g., U.S. Pat. Nos. 4,956,071 and 5,558,753). Drawbacks of this approach include the production of low quality water during some parts of the operating cycle and the complexity and expense of the valving system needed to implement the process.

The special problem of calcium carbonate precipitation in the cathode compartment, exacerbated by the formation of hydroxide ions, has been dealt with by filling the cathode compartment with an electrically conductive medium. (E.g., U.S. Pat. No. 5,593,563). This is said to reduce the concentration of hydroxide ions at the surface of the electrode by distributing the current over a larger area and thus decreasing the degree of calcium carbonate supersaturation.

Calcium carbonate scaling can be prevented by reducing or eliminating any of the three prerequisites of scaling: calcium, carbon dioxide and bicarbonate or alkaline pH. The brute force chemical approaches—softening the RO feed or adding acid to the cathode compartment or to the concentrate—re-institute the very problems of chemical supply and waste disposal that EDI is designed to eliminate and are therefore fundamentally unacceptable. More acceptable approaches are the softening of the EDI feed, which has a much lower concentration of calcium than the RO feed, or the removal of carbon dioxide by air stripping. These approaches entail additional capital costs and operating expenses. It has also been suggested that the concentration of salts in the concentrating compartment be reduced by reducing the fraction of the feed water that is recovered as the pure water stream. This approach is fundamentally unacceptable because of its expense.

SUMMARY

In one aspect, the invention features, in general, using first and second stages in electrodeionization to purify water including calcium and carbon dioxide and its hydrates. The diluting flow channels of the first stage include only anion exchange material or cation exchange material, and thus remove either carbon dioxide and its hydrates (and other anions) or calcium (and other cations) but not the other. The diluting flow channels of the second stage receive the diluting channel effluent from the first stage and include the other type of exchange resin (or a mixed resin) and remove the oppositely charged ions. The brine effluent from the concentrating flow channels in the first stage is isolated from the second stage, and calcium and carbon dioxide and its hydrates tend to be removed in different stages so as to deter calcium carbonate precipitation in any of the concentrating flow channels.

In another aspect, the invention features, in general, using electrodeionization to purify water including calcium and inorganic carbon. The concentrating channels include cation exchange material nearer to the anion membrane than the cation membrane, and pH is lowered at the surface of the anion so as to limit calcium carbonate precipitation in the concentrating flow channel.

Preferred embodiments of the invention may include one or more of the following features. Each concentrating flow channel can include anion exchange material between the cation membrane and the cation exchange material so that water splitting occurs between the anion exchange material and the cation exchange material. The anion exchange material in the concentrating channel is in a first fixed structure, and the cation exchange material in the concentrating channel is in a second fixed structure. The anion exchange material and cation exchange material in the concentrating channel can directly contact each other, or they can be separated by an a cation membrane, cation/anion membrane pair, or a bipolar membrane. Water splitting occurs at the interface of an anion material or membrane with a cation material or membrane. The anion exchange material or cation exchange material in the concentrating channel can be provided as two layers with a membrane that inhibits mixing of the brine in the anion exchange layer with the brine in the cation exchange layer, such as a dialysis membrane, located between the two layers. This membrane is chosen so as not to increase the electrical resistance of the concentrating compartment unduly. One can use the various membranes and layers in the concentrating channels in single stage electrodeionization or in two-stage electrodeionization to provide even further improvements in reduced scaling.

In another aspect, the invention features, in general, using electrodeionization to purify water including calcium and inorganic carbon. There is countercurrent flow in the diluting flow channels and the concentrating flow channels, such that calcium is avoided at the concentrating side of the anion membranes in the region where scaling is likely to occur so as to limit calcium carbonate precipitation in a concentrating flow channel.

In particular embodiments, the diluting flow channels include a mixture of cation and anion resins. Alternatively, the diluting flow channels can include cation resin only at the diluting inlets.

In another aspect, the invention features, in general, using electrodeionization to purify water including calcium and inorganic carbon by flowing the feed to the concentrating compartment first through a region that renders it substantially acidic before it enters a region that contains calcium.

In particular embodiments the concentrating flow channel includes first and second flow channel portions in overlying relation, with the outlet of the first flow channel being connected to the inlet of the second flow channel. The first flow channel includes an anion resin, and the second flow channel includes a cation resin. The first flow channel and the second flow channel can be separated by a cation membrane or by a bipolar membrane. The first channel inlets and the second channel outlets can be adjacent to the diluting outlets, and the diluting inlets can be the adjacent to the first channel outlets and the second channel inlets. Alternatively, the first channel inlets and the second channel inlets can be adjacent to the diluting outlets, and the diluting inlets can be adjacent to the first channel outlets and the second channel outlets. The second channel outlet can be connected to divert a portion of its effluent to the first channel inlet in order to maintain a high flow rate without the use of excessive amounts of fresh feed.

Embodiments of the invention may include one or more of the following advantages. The tendency of scaling is reduced by modifying the design of the EDI stack without additional unit operations.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
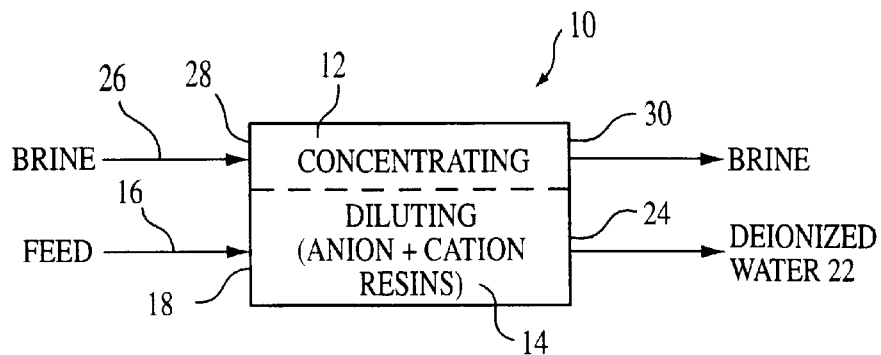
FIG. 1 is a flow diagram of a single-stage electrodeionizing apparatus.
Figure 2:
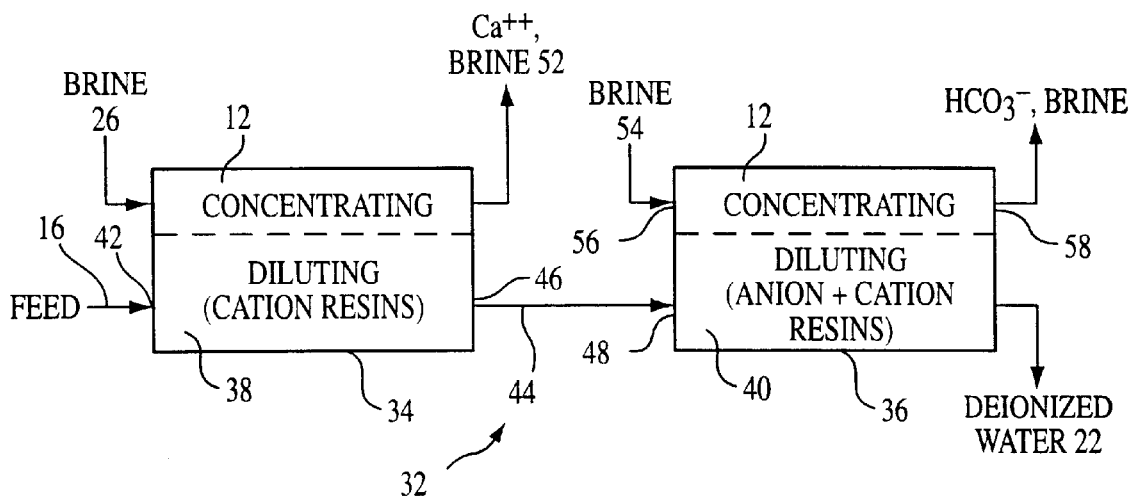
FIG. 2 is a flow diagram of a two-stage electrodeionizing apparatus.
Figure 3:
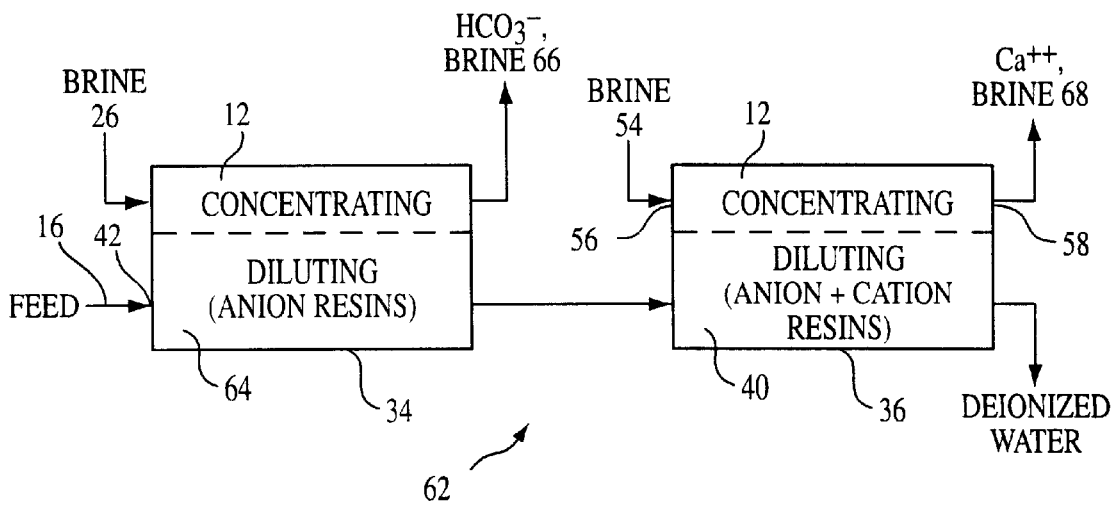
FIG. 3 is a flow diagram of an alternative two-stage electrodeionizing apparatus.

Referring to FIGS. 1–3, there are shown three different flow configurations for electrodeionization apparatus. Single-stage electrodeionization apparatus 10 is shown in FIG. 1. Apparatus 10 has a plurality of concentrating chambers 12 (shown as a single box in FIG. 1) and a plurality of diluting chambers 14 (again shown as a single box) which have both anion exchange resin and cation exchange resin. Feed water 16 (typically the output of RO apparatus) enters inlet 18 of the diluting chambers 14, and is therein converted to deionized water 20 provided at outlet 24. Brine 26 enters inlet 28 of concentrating chambers 12, picks up ions removed from the diluting channels, and leaves outlet 30. By employing one of the arrangements described in FIGS. 6–11 for concentrating channel 12, single-stage electrodeionization apparatus 10 can be provided with resistance to scaling formation.

Two-stage electrodeionization apparatus 32 is shown in FIG. 2. Apparatus 32 has first stage 34 and second stage 36. Both stages 34, 36 have a plurality of concentrating chambers 12 and a plurality of diluting chambers, though diluting chambers 38 of first stage 34 have only cation exchange resin, while diluting chambers 40 of second stage 36 have both anion exchange resin and cation exchange resin. Feed water 16 enters inlet 42 of the diluting chambers 38, and the effluent 44 at the outlet 46 of diluting chambers 38 is connected as the inflow to the inlet 48 of diluting chamber 40 of second stage 36. Brine 26 enters inlet 50 of concentrating chambers 12 of first stage 34, picks up cations removed from the diluting channels, and leaves outlet 30 as brine 52, including Ca++. Water splitting at the interface of the anion membrane with the cation exchange material in the diluting channels 38 regenerates the cation resin and replaces the cations that are removed with H+, which converts HCO3– in the feed water into CO2. This suppresses the transfer of TIC into the concentrating compartment and thus reduces the scaling potential, even though the pH of the concentrating compartment is alkaline. Fresh brine 54 enters inlet 56 of concentrating chambers 12 of second stage 36, picks up anions (in particular HCO3–), weak acids and cations not removed in the first stage, and leaves outlet 58 as brine 60, including HCO3–. Deionized water 22 leaves diluting chamber 40. Because Ca++ is removed in the first stage without HCO3–, and HCO3– is removed in the second stage without Ca++, Ca++ and HCO3– do not coexist at the same location in the apparatus, and CaCO3 precipitation is avoided. Two-stage apparatus 32 thus inherently provides scaling resistance regardless of the type of design for concentrating channels 12. One can additionally use one of the arrangements shown in FIGS. 6–11 for concentrating channels 12, to reduce any scaling potential due to the presence of small concentrations of TIC that were transferred from the diluting channel via the solution phase. This provides even further resistance to scaling.

Two-stage electrodeionization apparatus 62, shown in FIG. 3, is similar to apparatus 32 (FIG. 2) except that the diluting chambers 64 of the first stage have anion exchange resins only, instead of cation exchange resin only as in diluting chambers 38 in FIG. 2. Brine 26 enters inlet 50 of concentrating chambers 12 of first stage 34, picks up anions removed from the diluting channels, and leaves outlet 30 as brine 66, including HCO3–. Water splitting at the interface between the anion exchange resin in channels 64 and the cation membrane renders the diluting channel alkaline. This converts carbon dioxide to bicarbonate and thus results in very complete removal of TIC into the concentrating compartment. The concentrating compartment 12 of first stage 34 is acidic, and hence no scaling can take place within it. It is possible that the LSI in the diluting compartment could become positive, for some feed compositions, and scaling could then take place. Minimization of this possibility requires careful control of the current density so as to avoid excessive regeneration of the resin in the diluting compartment. Fresh brine 54 enters inlet 56 of concentrating chambers 12 of second stage 36, picks up cations (in particular Ca++) and cations not removed in the first stage, and leaves outlet 58 as brine 68, including Ca++. Because HCO3– is removed in the first stage without Ca++, and Ca++ is removed in the second stage without HCO3–, Ca++ and HCO3– do not coexist at the same location in the apparatus, and CaCO3 precipitation is avoided. Two-stage apparatus 62 thus inherently provides scaling resistance regardless of the type of design for concentrating channels 12. When one of the arrangements shown in FIGS. 6–11 is used for concentrating channels 12, even further resistance to scaling can be provided.

Figure 4:
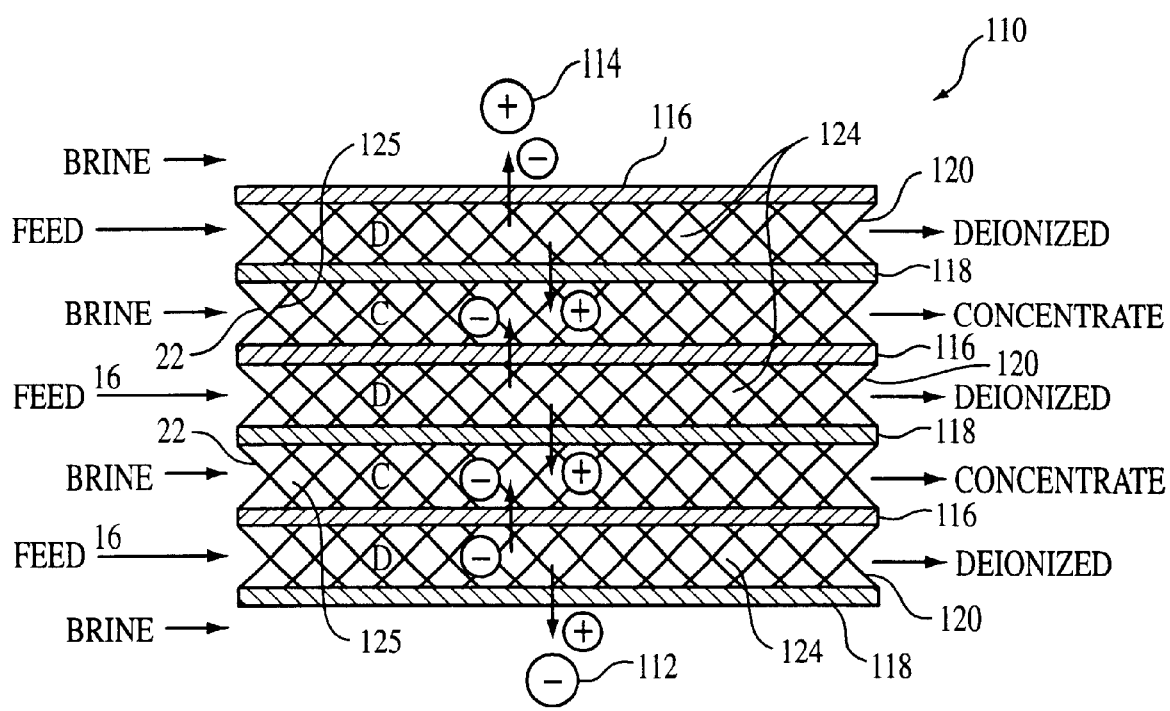
FIG. 4 is a diagram of an electrodeionization stack useful in the FIGS. 1, 2 or 3 apparatus.

FIG. 4 shows the details of electrodeionization stack 110, used in single-stage electrodeionization apparatus 10 and in first stage 34 and second stage 36 of two-stage deodorization apparatus 32 and two-stage electrodeionization apparatus 62. Stack 110 includes cathode 112, anode 114 spaced from cathode 112, and a plurality of alternating anion permeable membranes 116, and cation permeable membranes 118. Diluting channels 120 ("D") are provided between each pair of an anion permeable membrane 116 that faces anode 114 and a cation permeable membrane 118 that faces cathode 112. Concentrating channels 122 ("C") are provided between each pair of an anion permeable membrane 116 that faces cathode 112 and a cation permeable membrane 118 that faces anode 114. Water flows are provided past the cathode 112 and the anode 114. Diluting channels 120 and concentrating channels 122 can be about 3.0 mm thick. Ion exchange materials 124 are located in diluting channels 120, and spacers 125 are located in concentrating channels 122. Ion exchange materials 124 can be fixed ion exchange materials, which are described below. Spacers 125 can be ion exchange resin or ion inactive, permeable material; examples of different spacer arrangements are described in FIGS. 6–11. Cathode 112, anode 114, membranes 116 and membranes 118 can be made of components and materials typically used in deodorization apparatus, as described, e.g., in the above-referenced patents, which are hereby incorporated by reference.

As is well known in the art, the components shown on FIG. 4 are assembled together as a stack between pressure plates held together by bolts or a hydraulic ram or in a housing that contains the components and provides manifolds to direct the incoming liquid to and the outgoing liquid from diluting channels 120 and concentrating channels 122. Diluting channels 120 and concentrating channels 122 are typically between 1.0 mm and 5.0 mm thick, and there typically are 10 to 300 diluting channels. The surface area of each membrane is typically between 0.5 and 5.0 square feet.

Fixed ion exchange materials 124 include cation exchange materials and anion exchange materials that are fixed in close contacting position with respect to each other. Such materials are described in detail in an application filed Sep. 13, 1999, U.S. Ser. No. 09/394,170 and entitled "Electrodeionization Apparatus with Fixed Ion Exchange Materials", which application is hereby incorporated by reference. Fixed ion exchange materials 124 can be provided in strands of combined anion and cation exchange materials in woven fabric, nonwoven fabric (randomly oriented strands) or extruded netting. Fixed ion exchange materials could also be provided by open cell foam and by combined exchange particles. The strands used in the fabrics can also take a variety of forms. The strands can be made in the form of a bundle of multiple filaments, in the form of braided strands, and in the form of a combined exchange particle filament, which is made of cation exchange particles and anion exchange particles that are held together by binder. The open cell foam includes cation exchange particles, anion exchange particles and binder and has an interconnected network of flow passages therethrough. The combined ion exchange particles are made up of cation exchange particles, anion exchange particles and binder and are sufficiently large so as to cause an acceptably low pressure drop in the flow channels. In some embodiments the ion exchange materials are not mixed, but instead include only anion exchange materials or particles or cation exchange materials or particles in a channel between membranes or region in a channel between membranes. While it is possible to use packed ion exchange in the diluting and concentrating channels in some cases, in all cases the preferred stack design is based on the fixed ion exchange structure described above.

Figure 5:
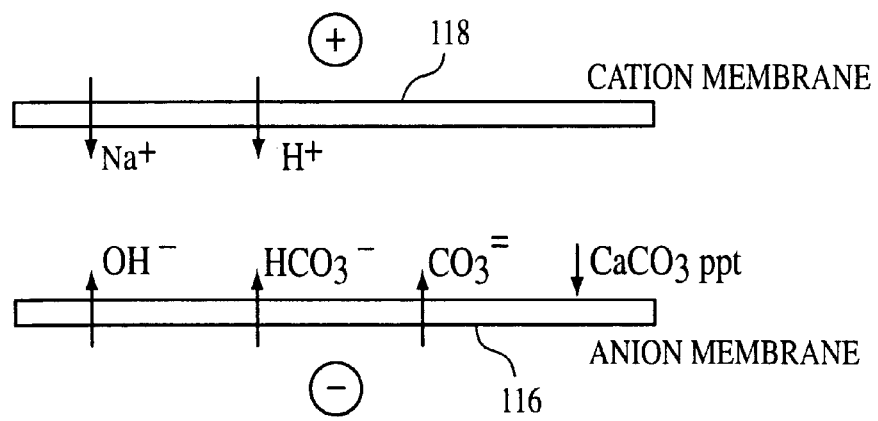
FIG. 5 is a diagram showing the conditions involved in scaling in a concentrating cell of electrodeionization apparatus.

FIG. 5 shows the ions involved in scaling in the concentration channel in the absence of measures to reduce or avoid such scaling as described herein.

FIGS. 6–11 show six different spacer arrangements for the concentrating channels 12 that are designed to provide a reduced pH at the surface of the anion membrane so as to avoid CaCO3 precipitation. The six concentrating channel arrangements can be used with any of the three different system configurations of FIGS. 1–3.

Figure 6:
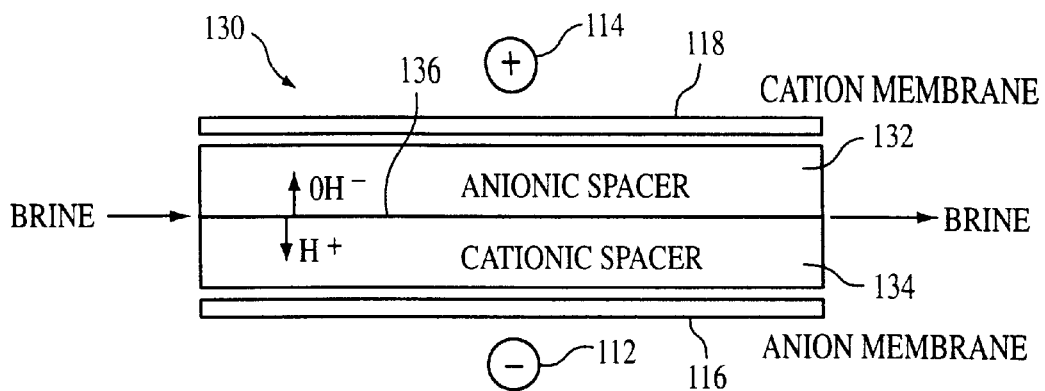
FIGS. 6–11 are diagrams of alternative embodiments for concentrating cells useful in the FIGS. 1, 2 or 3 apparatus.

Referring to FIG. 6, concentrating channel 130 is filled with a layer of anion exchanging material 132 (also referred to as anionic spacer 132) next to the cation permeable membrane 118 and a layer of cation exchanging material 134 (also referred to as cationic spacer 134) next to anion permeable membrane 116. Water splitting takes place at interface 136 of layers 132 and 134. The effect of this water splitting is to render acidic the cation exchange layer 134 and its bounding anion exchange membrane 116, which prevents scale formation at anion exchange membrane 116. The cation exchange material is sufficiently close to the anion membrane so as to provide hydrogen ions to the surface of the anion membrane facing the concentrating flow channel.

Figure 7:
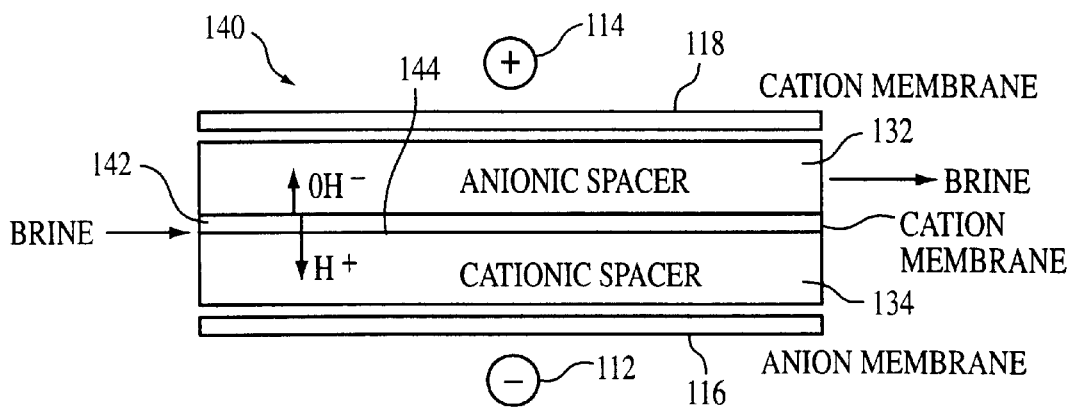

Referring to FIG. 7, concentrating channel 140 is similar to concentrating channel 130 (FIG. 6), except that cation permeable membrane 142 is placed between anionic spacer 132 and cationic spacer 134. Membrane 142 creates two separate brine streams, and water splitting now occurs at interface 144 of anionic spacer 132 and cation permeable membrane 142. This creates two separate concentrate streams. The concentrate stream flowing through the anion exchanging layer contains calcium, is slightly alkaline and contains no TIC and hence cannot scale. The concentrate stream flowing through the cation exchanging layer contains TIC and is slightly acidic, but it contains no calcium and hence cannot scale. This approach provides a very high degree of protection against scaling.

Figure 8:
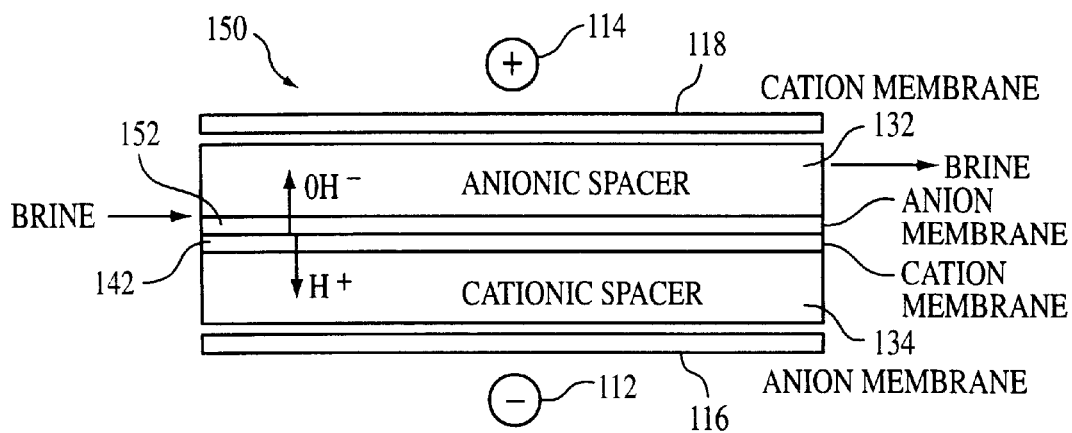

Referring to FIG. 8, concentrating channel 150 is similar to concentrating channel 140 (FIG. 7) except that anion permeable membrane 152 is placed between anionic spacer 132 and cation permeable membrane 142. Water splitting now takes place between membranes 132 and 142, and cation spacer 134 is again rendered acidic, preventing scale formation at anion membrane 116. These membranes furthermore prevent the transfer of cations to the acidic brine compartment in spacer 134 and of anions to the basic brine compartment in spacer 132.

Figure 9:
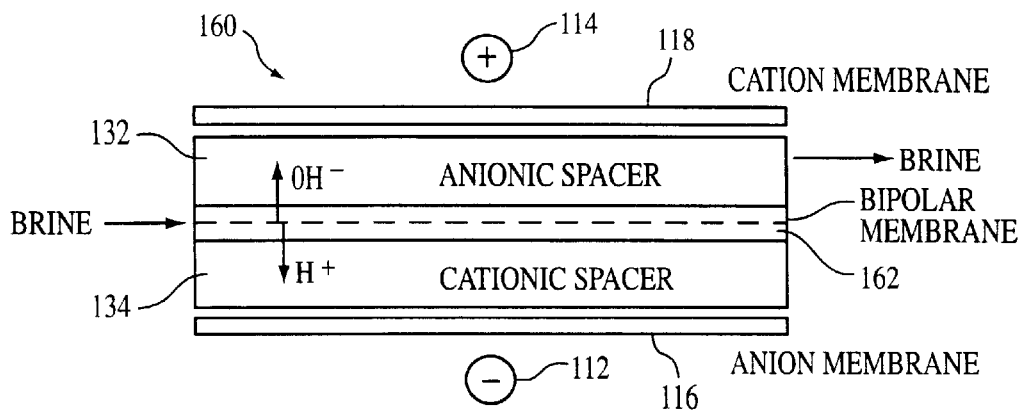

Referring to FIG. 9, concentrating channel 160 is similar to concentrating channel 150 (FIG. 8) except that bipolar membrane 162 replaces anion permeable membrane 152 and cation permeable membrane 142. Water splitting now takes place within bipolar membrane 162 at the interface of the cation and anion parts, and cation spacer 134 is again rendered acidic, preventing scale formation at anion membrane 116. Bipolar membrane 162 furthermore prevents the transfer of cations to the acidic brine compartment in spacer 134 and of anions to the basic brine compartment in spacer 132.

Figure 10:
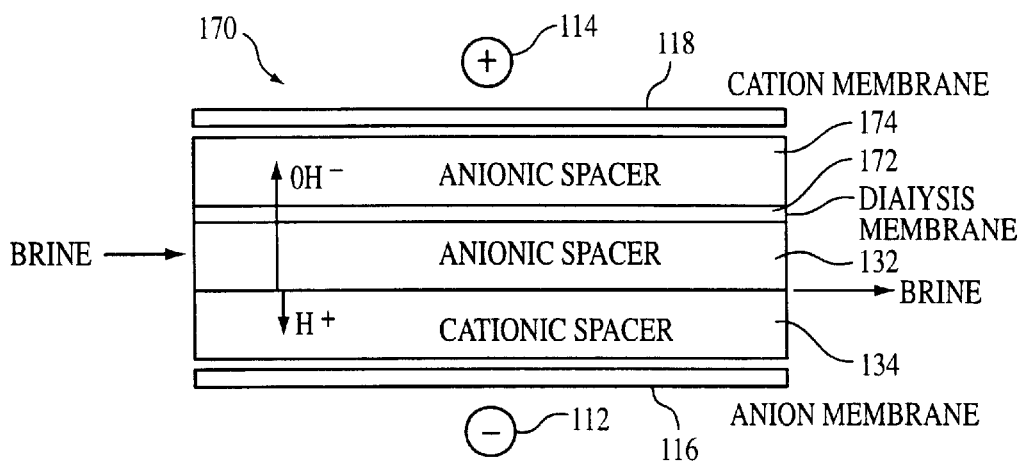

In concentrating compartment 170, shown in FIG. 10, there is direct contact between cationic spacer 134 and anionic spacer 132, and there is dialysis membrane 172 and additional anionic spacer 174 between spacer 132 and cation membrane 118.

Figure 11:
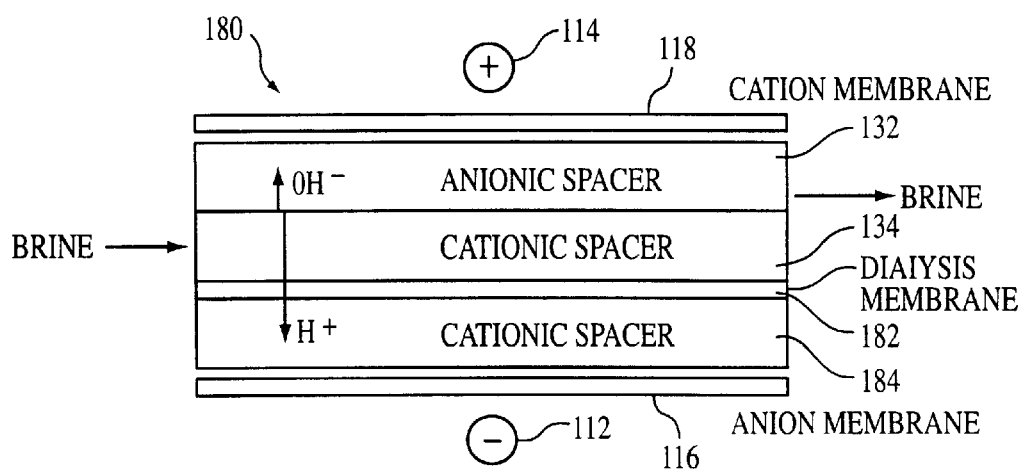

In concentrating compartment 180, shown in FIG. 11, there is direct contact between cationic spacer 134 and anionic spacer 132, and there is dialysis membrane 182 and additional cationic spacer 184 between spacer 132 and cation membrane 118. The dialysis membrane serves to inhibit the mixing of the alkaline portion of the brine, which contains Ca++, with the acidic portion of the brine and thus serves to reduce scaling potential.

In operation of deionization apparatus 10, 32 and 62, feed and brine are supplied to diluting channels 120 (FIG. 4) and concentrating channels 122, respectively, at typical flow rates (e.g., 1–3 cm/sec) and pressure (e.g., 5 to 50 psig), and electric power is supplied to cathode 112 and anode 114 to provide an appropriate current density of 2 to 15 mA/square cm and voltage of 1 to 5 volts per cell pair. The feed 16 supplied to the inlets 18, 42 (FIGS. 1–3) of diluting channels 120 is typically the permeate of reverse osmosis processing. The brine 26 supplied to the inlets of concentrating channels 22 is typically a mixture of the reverse osmosis permeate and brine recirculated from the outlet of the electrodeionization apparatus.

The removal of ions from diluting channels 120 includes two steps. The first step is the diffusion of cations to the cation exchanging solids and the diffusion of anions to the anion exchanging solids in the diluting channels. The applied electric field then causes anions on the exchanging material to travel along the anion exchanging material in the diluting channels in a conductive path to and through the anion permeable membrane into the concentrating compartment nearer the anode. The applied electric field similarly causes cations to travel along the cation exchanging materials in the diluting channels in a conductive path to and through the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane.

Figure 12:
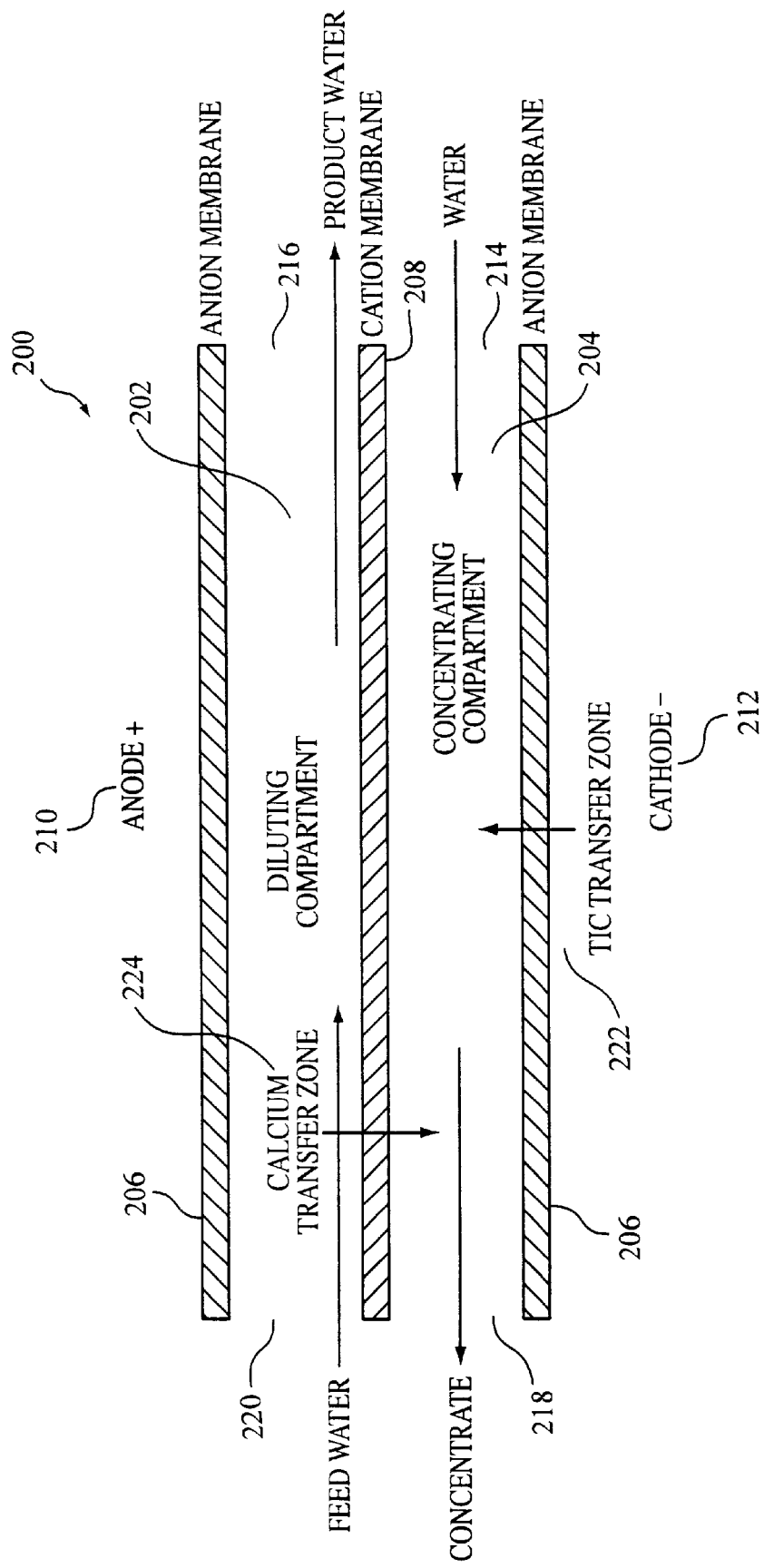
FIGS. 12–16 are diagrams of alternative embodiments for the concentrating and diluting channels of an electrodeionizing apparatus.

FIGS. 12–16 show alternative embodiments for concentrating channels and diluting channels to provide for reduced scaling. In general, in these embodiments, there are provisions for maintaining all parts of the concentrating compartments at a pH lower than a pH that can lead to "scaling" even in the presence of both calcium and TIC species. This improvement is achieved in two ways. The first approach, shown in FIG. 12, is by arranging the flow of solution in the concentrating stream in a counter-current direction to the flow of water through the diluting compartments so that little or no calcium is present at the concentrating side of the anion membrane in the region where scaling has a tendency to occur. The second, shown in different embodiments in FIGS. 13–16, is by flowing the water feed to the concentrating compartment first through a region that renders it substantially acidic before it enters a region that contains calcium. These embodiments will now be discussed in detail with reference to FIGS. 12–16, which show a pair of a concentrating channel and a diluting channel between two anion membranes and a cathode membrane, which are all shown positioned between an anode and a cathode. In the actual stacks, there are a larger number of alternating diluting channels and concentrating channels defined between alternating anion membranes and cation membranes.

FIG. 12 shows stack 200 with diluting channel 202 and concentrating channel 204 (also referred to as "compartments") between anion membranes 206 and cation membrane 208, which are all positioned between anode 210 and cathode 212. The diluting channels and concentrating channels include spacer material, as described above. Water enters the concentrating compartment 204 at concentrating inlet 214 at the same end of the stack that product water leaves the diluting compartment 202 at diluting outlet 216. Concentrate leaves the concentrating compartment 204 at concentrating outlet 218 at the same end of the stack that feed water enters the diluting compartment 202 at diluting inlet 220. As has been explained above, the TIC enters the concentrating compartment in the middle portion of the diluting flow path at TIC transfer zone 222. It is in this general area that scaling would take place on the concentrating side of the anion membrane 206, because calcium ions in the concentrating channel can diffuse into the high pH region adjacent to the anion membrane 206 where the LSI index is positive. It is known that calcium leaves the diluting compartment 202 and enters the concentrating compartment 204 primarily at calcium transfer zone 224 at the feed water inlet side near inlet 220, because calcium is a doubly valent ion and is therefore adsorbed preferentially by the cation resin in the diluting compartment. In the flow configuration shown in FIG. 12 the brine stream (in concentrating channel 204) does not pick up calcium until it has passed the critical central portion of the flow path, where scaling could otherwise occur. In the region where calcium enters the flowing brine stream, the pH values are closer to neutrality, because, as has been explained above, little water splitting takes place at the feed water entrance end of the stack. By this means it is possible to avoid the introduction of calcium ions into the region of the concentrating compartment 204 where TIC is present at high pH, and calcium carbonate scaling is thus avoided.

The approach shown in FIG. 12 reduces scaling tendencies in a conventional electrodeionization diluting compartment, which contains a mixture of cation and anion resins. The approach is even more effective when used in conjunction with a diluting channel that has the feed end filled with just cation resin. By this means the removal of calcium is more completely confined to the front end of the electrodeionization stack and intrusion of calcium into the central part of the stack, which as explained above, is prone to scaling, is more completely avoided.

Figure 13:
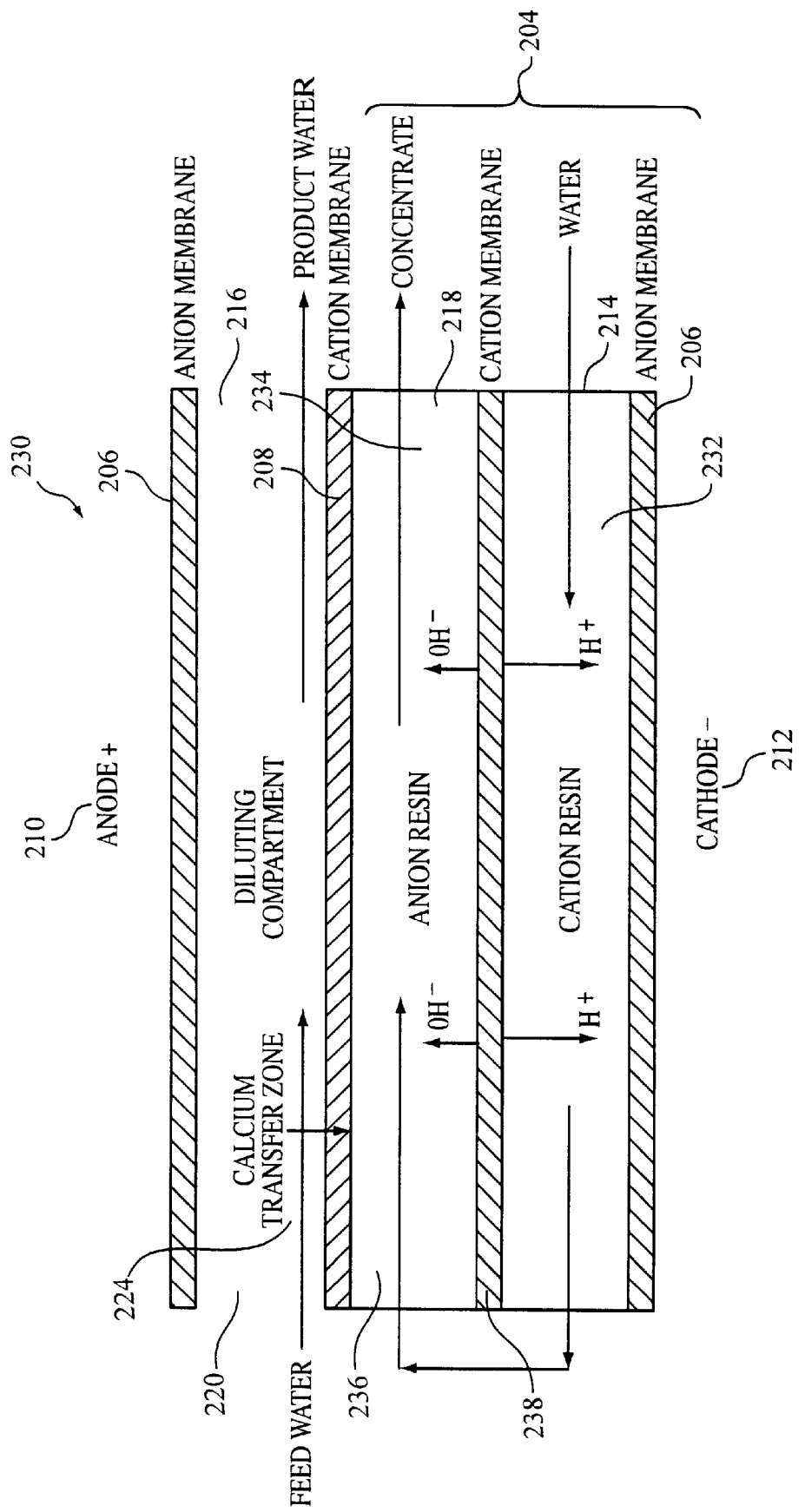
Figure 17:
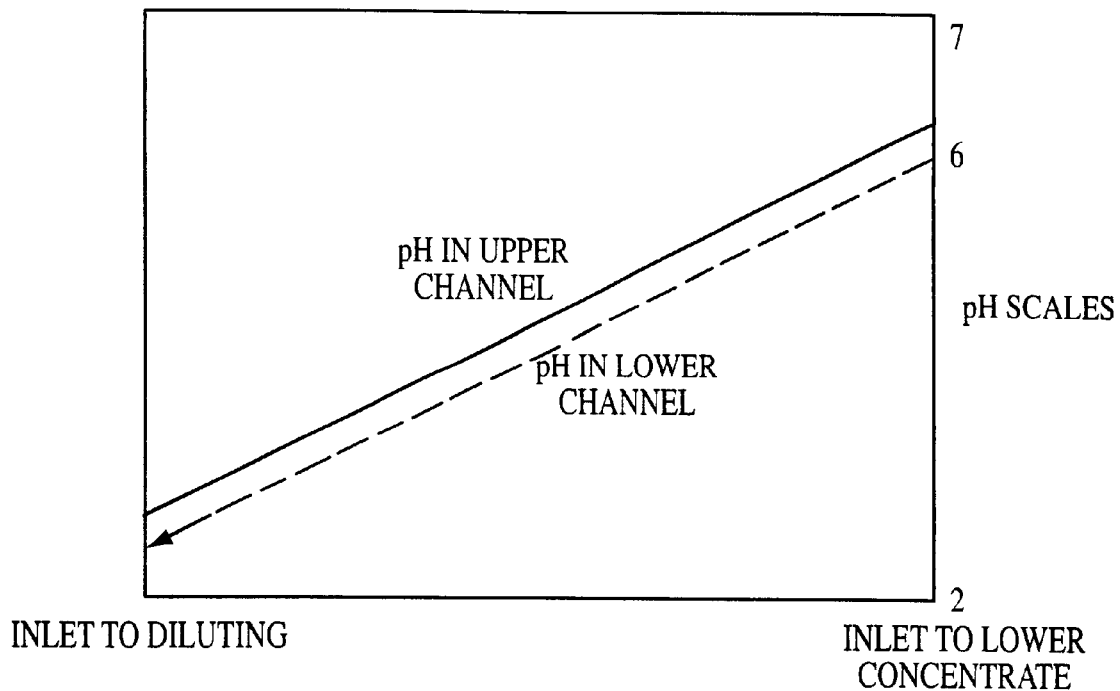
FIG. 17 is a diagram of pH versus position in concentrating and diluting channels for the embodiment of FIG. 13.

FIG. 13 shows stack 230, which embodies the second approach mentioned above. Stack 230 has concentrating channels with two compartments 232, 234 therein, similar to the configuration shown above in FIGS. 6–11. Water enters the lower channel 232 of the concentrating compartment 204 at the end of the stack where the product water leaves at diluting outlet 216. After flowing through this channel 232 it enters the upper channel 234 of the concentrating compartment 204, as indicated in FIG. 13, and leaves at the same end of the stack as it entered through concentrate outlet 218. The lower channel 232 of the concentrating compartment 204 is acidic because the entry of cations from the upper concentrating compartment 234 is very small as that channel is filled with an anion resin 236, and the conductivity of cations is therefore low. Electrical neutrality in the lower concentrating compartment 232 is maintained by hydrogen ions, produced by water splitting at the interface of the cation membrane 238 splitting the concentrating compartment 204 and the anion resin 236 filling the upper part 234 of the concentrating compartment 204. Thus the ionic solute in the lower brine compartment 232 consists almost exclusively of the acids of the anion in the feed water, $H_2CO_3$, HCl and $H_2SO_4$. The stream flowing through the lower brine compartment 232 picks up more and more acid, and at the outlet of this compartment its pH is between 2 and 3. On entering the upper channel 234 of the concentrating compartment 204 it becomes gradually neutralized by the $OH^-$ ions that enter this channel 234 in an amount corresponding exactly to the H⁺ ions that were present in the lower concentrating channel 232. Consequently the pH of the solution in the upper concentrating channel 234 is always acidic and only approaches the pH of the feed water to the electrodeionization apparatus at the concentrating outlet 218. Since the pH of feed water at the water inlet 220, being always a reverse osmosis permeate, to the electrodeionization apparatus is always slightly acidic, no scaling by calcium carbonate precipitation can take place anywhere in the stack. FIG. 17 illustrates in semi-quantitative form the expected pattern of pH variation. The two lines are in fact close to coincident and are shown as slightly separated for the sake of clarity.

Figure 14:
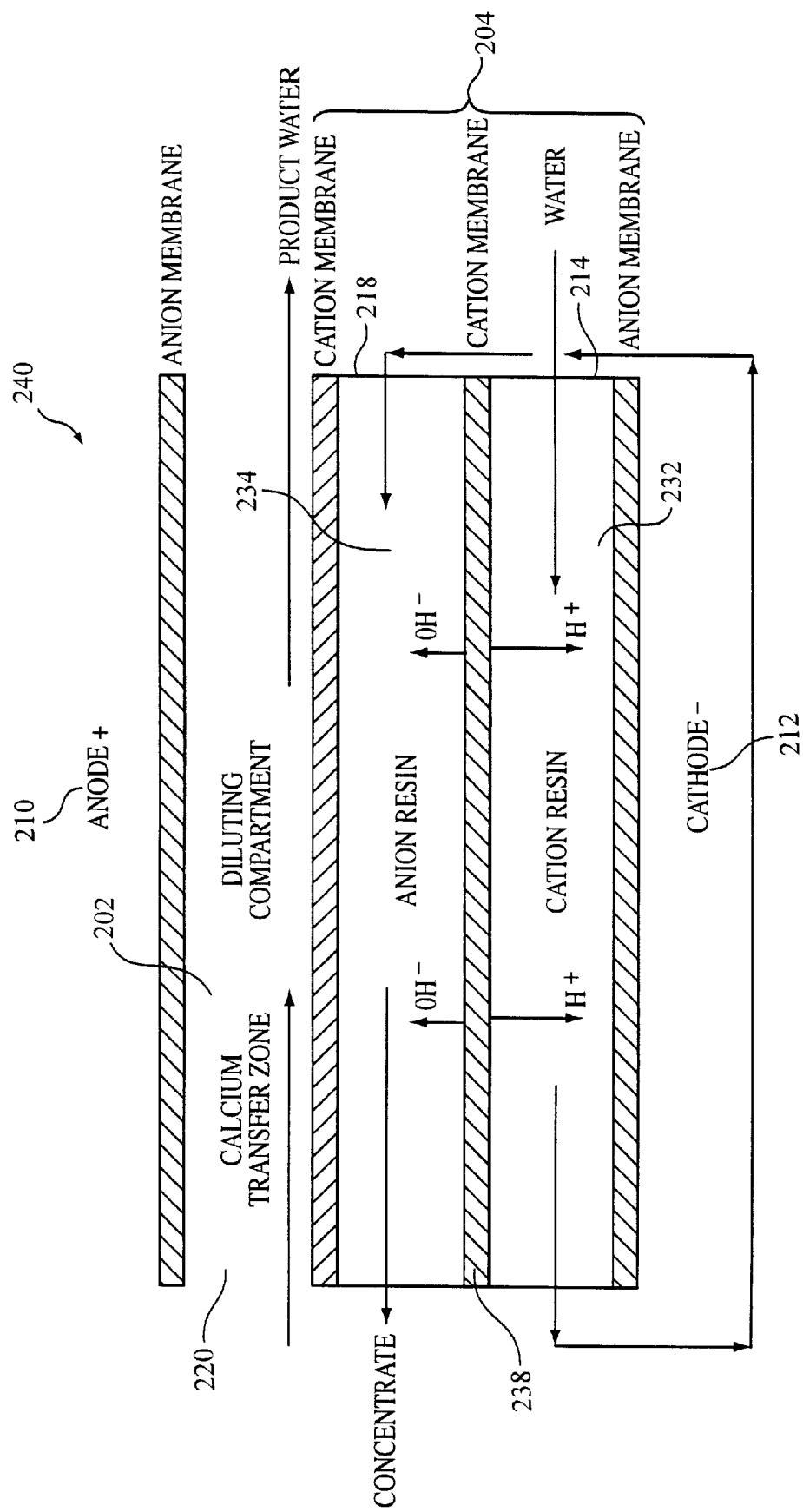
Figure 15:
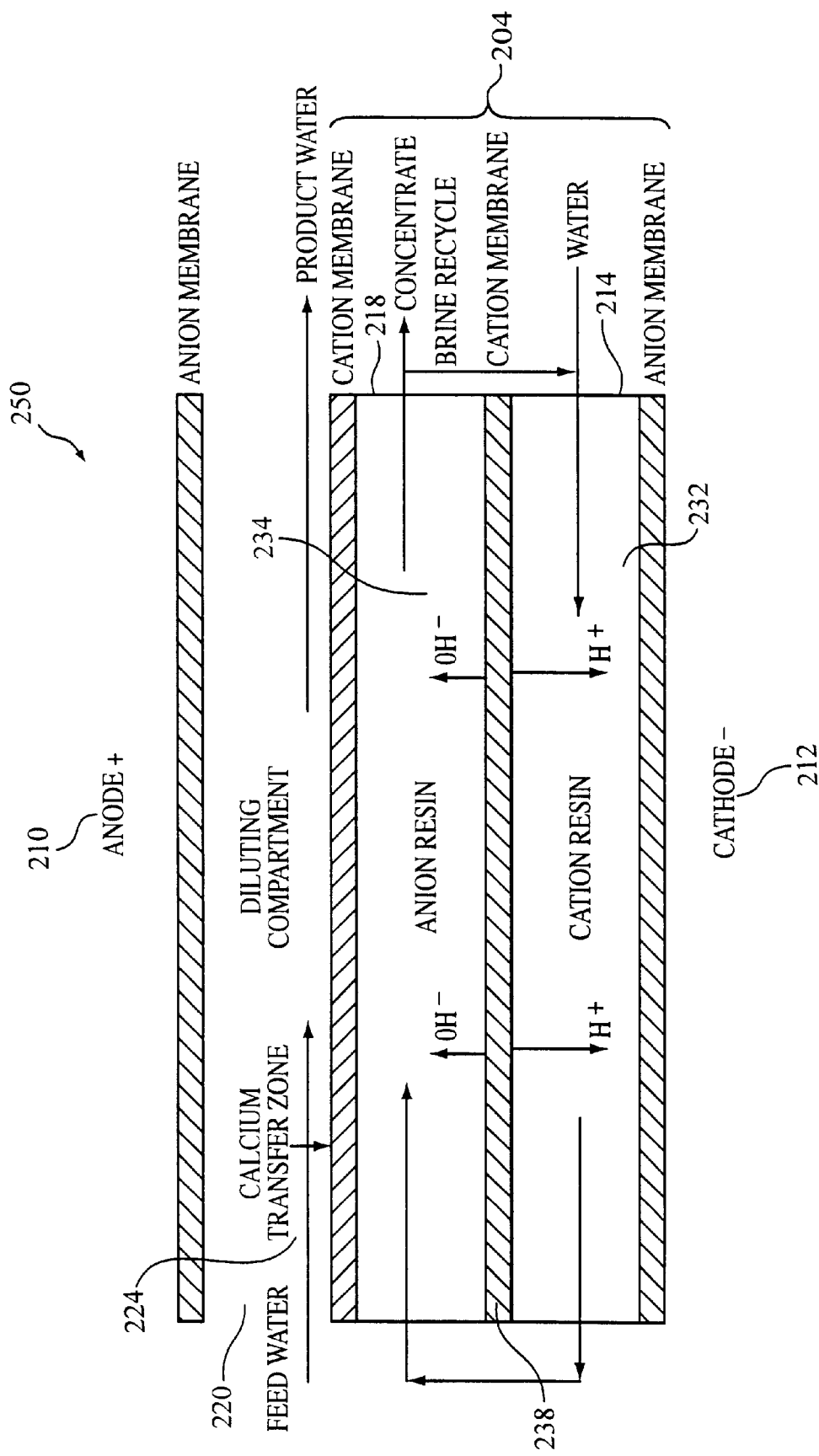
Figure 16:
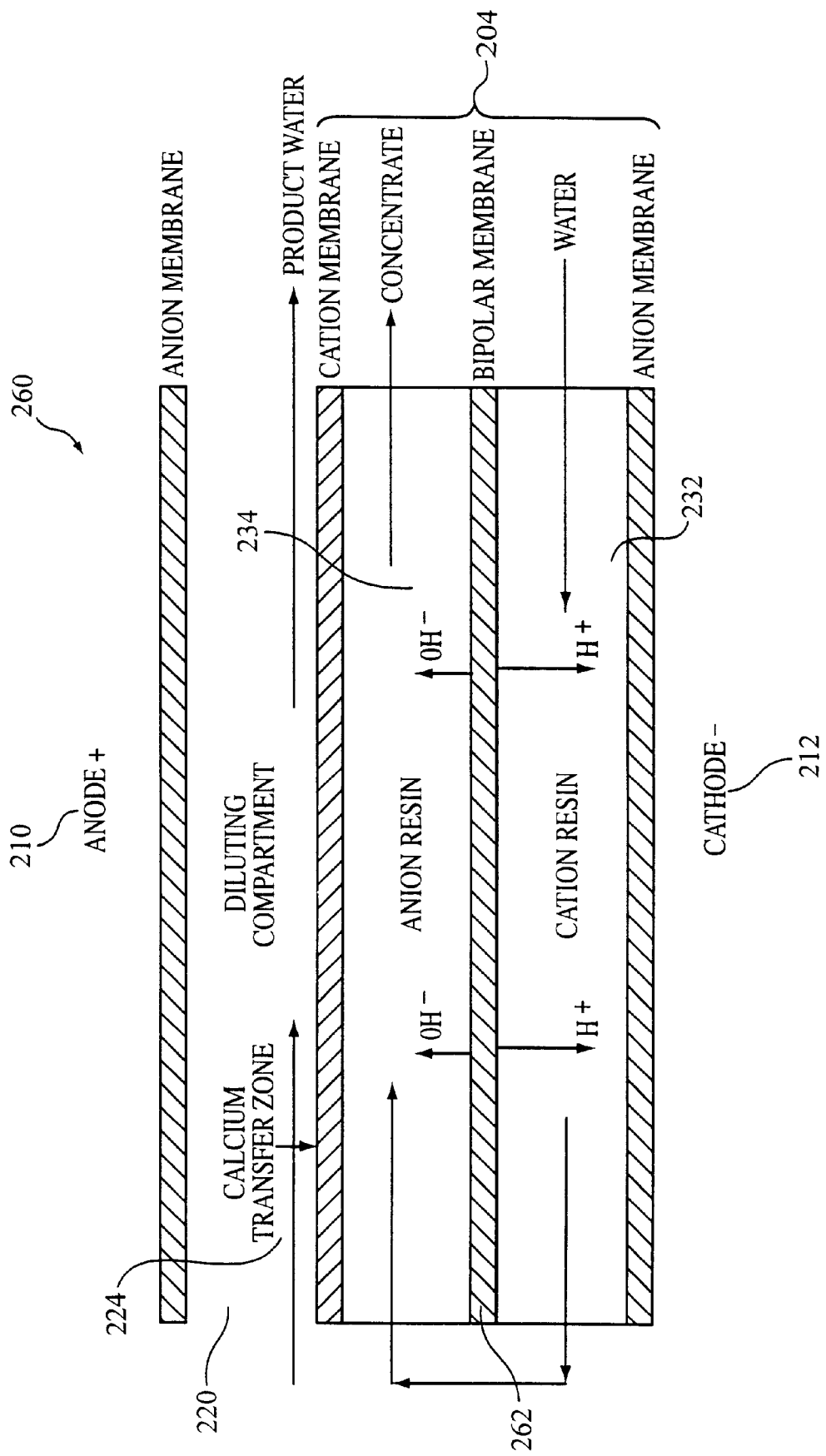

Other variants of the design in FIG. 13 are depicted in FIGS. 14–16. FIG. 14 shows a stack 240 in which the brine stream enters the upper concentrating compartment 234 at the same end of the stack as it enters the lower concentrating compartment 232 by an concentrating inlet 214. In fact any combination of entry points is suitable as long as the brine stream enters the upper brine compartment 232 after having passed through enough channels of the lower brine compartment 234 so as to render it acidic.

FIG. 15 shows a stack 250 in which a portion of the brine leaving the upper concentrating channel 234 is recycled to the lower concentrating channel 232. This design may be beneficial in maintaining a high flow rate in the concentrating channels 232, 234, without the use of excessive amounts of water. It does have the drawback of introducing some calcium ions into the scaling prone area of the lower concentrating channel 232 and should therefore be used only when the concentration of calcium in the feed water to the electrodeionization apparatus is low, preferably less than 2 ppm.

FIG. 16 shows a stack 260 in which a bipolar membrane 262 is used to generate the H⁺ ions required to render the lower channel 232 acidic. This design can be combined with any of the flow directions previously described in FIGS. 13–15. Although, in FIG. 16, the stack is shown with anion resin in the upper concentrating channel 234 and cation resin the lower concentrating channel 232, it can be used with inert filling material in the channels since the water splitting function that it provides is within the membrane itself and contact with anion exchange resin is not required.

Figure 18:
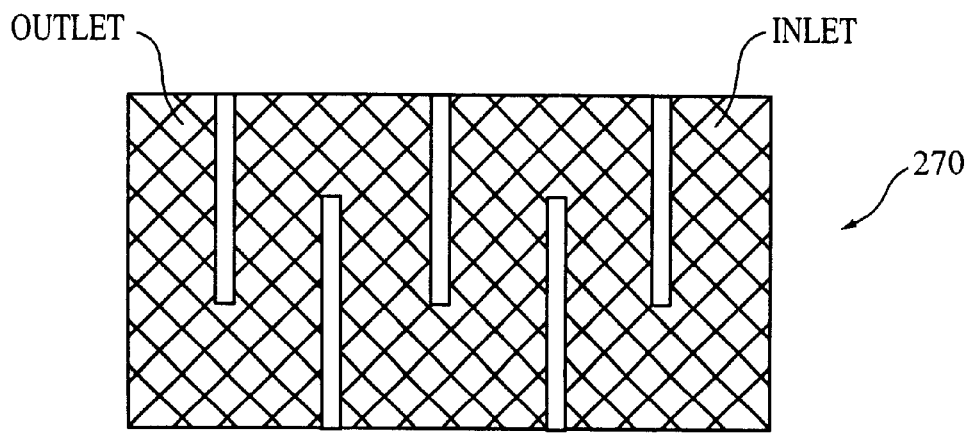
FIG. 18 is a diagram of a serpentine flow path in a concentrating channel.

Although all of flow directions in the Figures are shown as being straight from inlet to outlet of each concentrating channel, it is to be understood that serpentine paths as shown in FIG. 18 in concentrating channel 270 can be used, if it is desired to raise the average velocity of the concentrating stream.

A number of embodiments of the invention have been described. Nevertheless, it will be understood that various modifications may be made without departing from the spirit and scope of the invention. Accordingly, other embodiments are within the scope of the following claims.

What is claimed is:

1. Electrodeionization apparatus for purifying water including calcium and carbon dioxide and its hydrates comprising:
   a cathode,
   an anode spaced from said cathode,
   a plurality of alternating anion permeable membranes and cation permeable membranes between said cathode and anode defining concentrating flow channels and diluting flow channels,
   each said channel being defined between an adjacent pair of said membranes,
   said concentrating flow channels each having a concentrating inlet and a concentrating outlet,
   said diluting flow channels each having a diluting inlet and a diluting outlet,
   said concentrating flow channels having first and second regions, said first region being upstream of said second region and beginning at said concentrating inlet and rendering feed therein substantially acidic, said second region being downstream of said first region and ending at said concentrating outlet and containing calcium,
   whereby calcium is introduced into said concentrating flow channels under acidic conditions so as to limit calcium carbonate precipitation in said concentrating flow channels.

2. The apparatus of claim 1 wherein said concentrating flow channel includes first and second flow channel portions in overlying relation, said first flow channel portion having a first flow channel inlet being said concentrating inlet and a first flow channel outlet, said second flow channel portion having a second outlet being said concentrating outlet and a second flow channel inlet, said first flow channel outlet being connected to said second flow channel inlet.

3. The apparatus of claim 2 wherein said first flow channel portion includes a cation resin, and said second flow channel portion includes an anion resin.

4. The apparatus of claim 3 wherein said first channel inlets and said second channel outlets are adjacent to said diluting outlets, and said diluting inlets are adjacent to said first channel outlets and said second channel inlets.

5. The apparatus of claim 3 wherein said first channel inlets and said second channel inlets are adjacent to said diluting outlets, and said diluting inlets are adjacent to said first channel outlets and said second channel outlets.

6. The apparatus of claim 3 wherein each said second channel outlet is connected to divert a portion of its effluent to said first channel inlet.

7. The apparatus of claim 2 wherein said first flow channel portion and said second flow channel portion are separated by a cation membrane.

8. The apparatus of claim 2 wherein said first flow channel portion and said second flow channel portion are separated by a bipolar membrane.

9. Electrodeionization apparatus for purifying water including calcium and carbon dioxide and its hydrates comprising:
   a cathode,
   an anode spaced from said cathode,
   a plurality of alternating anion permeable membranes and cation permeable membranes between said cathode and anode defining concentrating flow channels and diluting flow channels,
   each said channel being defined between a pair of said membranes,
   said concentrating flow channels each having a concentrating inlet and a concentrating outlet,
   said diluting flow channels each having a diluting inlet and a diluting outlet,
   said concentrating inlets being adjacent to said diluting outlets, and said diluting inlets being adjacent to said concentrating outlets,
   whereby there is countercurrent flow in said diluting flow channels and said concentrating flow channels, such that calcium is avoided at the concentrating side of the anion membranes in the region where scaling is likely to occur so as to limit calcium carbonate precipitation in said concentrating flow channel, wherein said diluting flow channels include cation resin only at the diluting inlets.

10. A method of purifying water including calcium and carbon dioxide and its hydrates comprising flowing said water into diluting channels of an electrodeionization system, and flowing feed through concentrating channels of said electrodeionization system in countercurrent flow with respect to flow in said diluting channels, wherein said diluting flow channels include cation resin only at the diluting inlets.

11. A method of purifing water including calcium and carbon dioxide and its hydrates comprising flowing said water into diluting channels of an electrodeionization system, and flowing feed through concentrating channels of said electrodeionization system having concentrating inlets and concentrating outlets and first and second regions, each said first region being upstream of said second region and beginning at said concentrating inlet and rendering feed therein substantially acidic, said second region being downstream of said first region and ending at said concentrating outlet and containing calcium, whereby calcium is introduced into said concentrating flow channels under acidic conditions so as to limit calcium carbonate precipitation in said concentrating flow channels.

12. The method of claim 11 wherein said concentrating flow channel includes first and second flow channel portions in overlying relation, said first flow channel portion having a first flow channel inlet being said concentrating inlet and a first flow channel outlet, said second flow channel portion having a second outlet being said concentrating outlet and a second flow channel inlet, said first flow channel outlet being connected to said second flow channel inlet.

13. The method and of claim 12 wherein said first flow channel portion includes a cation resin, and said second flow channel portion includes an anion resin.

14. The method of claim 13 wherein said first channel inlets and said second channel outlets are adjacent to said diluting outlets, and said diluting inlets are adjacent to said first channel outlets and said second channel inlets.

15. The method apparatus of claim 13 wherein said first channel inlets and said second channel inlets are adjacent to said diluting outlets, and said diluting inlets are adjacent to said first channel outlets and said second channel outlets.

16. The method of claim 12 wherein said first flow channel portion and said second flow channel portion are separated by a bipolar membrane.

17. The method of claim 12 wherein said first flow channel portion and said second flow channel portion are separated by a cation membrane.

* * * * *

UNITED STATES PATENT AND TRADEMARK OFFICE
CERTIFICATE OF CORRECTION

PATENT NO. : 6,296,751 B1  Page 1 of 1
DATED : October 2, 2001
INVENTOR(S) : Dr. Leon Mir It is certified that error appears in the above-identified patent and that said Letters Patent is hereby corrected as shown below:

<u>Title page,</u>
Related U.S. Application Data, "Pat. No. 6,187,182" should be -- Pat. No. 6,187,162 --

Signed and Sealed this

Twenty-sixth Day of March, 2002

*Attest:*

*Attesting Officer*

JAMES E. ROGAN
*Director of the United States Patent and Trademark Office*